US012625303B2

(12) United States Patent
Lin

(10) Patent No.: US 12,625,303 B2
(45) Date of Patent: May 12, 2026

(54) HEAD-UP DISPLAY SYSTEM

(71) Applicant: Himax Display, Inc., Tainan City (TW)

(72) Inventor: Chi-Wen Lin, Tainan City (TW)

(73) Assignee: Himax Display, Inc., Tainan City (TW)

( * ) Notice: Subject to any disclaimer, the term of this patent is extended or adjusted under 35 U.S.C. 154(b) by 394 days.

(21) Appl. No.: 18/358,891

(22) Filed: Jul. 25, 2023

(65) Prior Publication Data

US 2025/0035926 A1 Jan. 30, 2025

(51) Int. Cl.
*G02B 5/02* (2006.01)
*G02B 27/01* (2006.01)
*G02B 27/48* (2006.01)

(52) U.S. Cl.
CPC ......... *G02B 5/0278* (2013.01); *G02B 5/0294* (2013.01); *G02B 27/0103* (2013.01); *G02B 27/48* (2013.01); *G02B 2027/0105* (2013.01); *G02B 2027/0118* (2013.01)

(58) Field of Classification Search
None
See application file for complete search history.

(56) References Cited

U.S. PATENT DOCUMENTS

| | | | |
|---|---|---|---|
| 2003/0039036 A1* | 2/2003 | Kruschwitz .......... | H04N 9/3132 359/623 |
| 2007/0217018 A1* | 9/2007 | Fredriksson ....... | G02B 27/0103 359/631 |
| 2014/0092481 A1* | 4/2014 | Hudson .................... | G02B 5/02 359/630 |
| 2021/0208391 A1* | 7/2021 | Fan-Chiang ....... | G03B 21/2073 |
| 2022/0350154 A1* | 11/2022 | Pankratz ............ | G02B 27/0179 |

FOREIGN PATENT DOCUMENTS

FR 2986873 A1 * 8/2013 ............... G02B 5/02

* cited by examiner

*Primary Examiner* — Derek S. Chapel
(74) *Attorney, Agent, or Firm* — JCIPRNET

(57) ABSTRACT

A head-up display system including a polarizing optical engine and a first rotatable diffuser is provided. The polarizing optical engine is configured to provide a polarized image beam. The first rotatable diffuser is disposed on a path of the polarized image beam and configured to rotate when the polarized image beam passes through the first rotatable diffuser. The first rotatable diffuser is made of isotropic material, and the polarized image beam from the first rotatable diffuser obliquely strikes a windshield and is then reflected by the windshield to an eye of a user.

9 Claims, 2 Drawing Sheets

HEAD-UP DISPLAY SYSTEM

BACKGROUND

Technical Field

The invention generally relates to a display system and, in particular, to a head-up display system.

Description of Related Art

A head-up display is a display that presents data without requiring users to look away from their usual viewpoints. A user of the head-up display is able to view information with the head positioned "up" and looking forward, instead of angled down looking at lower instruments. A head-up display also has the advantage that the user's eyes do not need to refocus to view the outside after looking at the optically nearer instruments.

When a head-up display adopts a laser light source, the head-up display may also adopt a rotating diffuser disposed on the path of a laser beam emitted by the laser light source to reduce the speckle phenomenon due to the laser beam. However, in a conventional head-up display, the rotating diffuser is made of plastic material which has birefringence. When the laser beam passes through the rotating diffuser, the polarization direction of the laser beam is rotated continuously with the rotation of the rotating diffuser. The laser beam from the rotating diffuser obliquely strikes a windshield, and the windshield reflects the s-polarized light of the laser beam to the eyes of a user. The rotating polarization direction of the laser beam causes the intensity of the s-polarized light increases and decreases continuously. As a result, the user will see a flickering image.

SUMMARY

Accordingly, the invention is directed to a head-up display system, which is able to provide a stable image.

An embodiment of the invention provides a head-up display system including a polarizing optical engine and a first rotatable diffuser. The polarizing optical engine is configured to provide a polarized image beam. The first rotatable diffuser is disposed on a path of the polarized image beam and configured to rotate when the polarized image beam passes through the first rotatable diffuser. The first rotatable diffuser is made of isotropic material, and the polarized image beam from the first rotatable diffuser obliquely strikes a windshield and is then reflected by the windshield to an eye of a user.

In the head-up display system according to the embodiment of the invention, the first rotatable diffuser is made of isotropic material, so that when the first rotatable diffuser rotates, the polarization direction of the polarized image beam does not rotate with the rotation of the first rotatable diffuser. As a result, when the windshield reflects an s-polarized light of the polarized image beam to the eye of the user, the intensity of the s-polarized light does not vary with the rotation of the first rotatable diffuser, so that the head-up display system can provide a stable image and can reduce speckle phenomenon by the rotation of the first rotatable diffuser.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
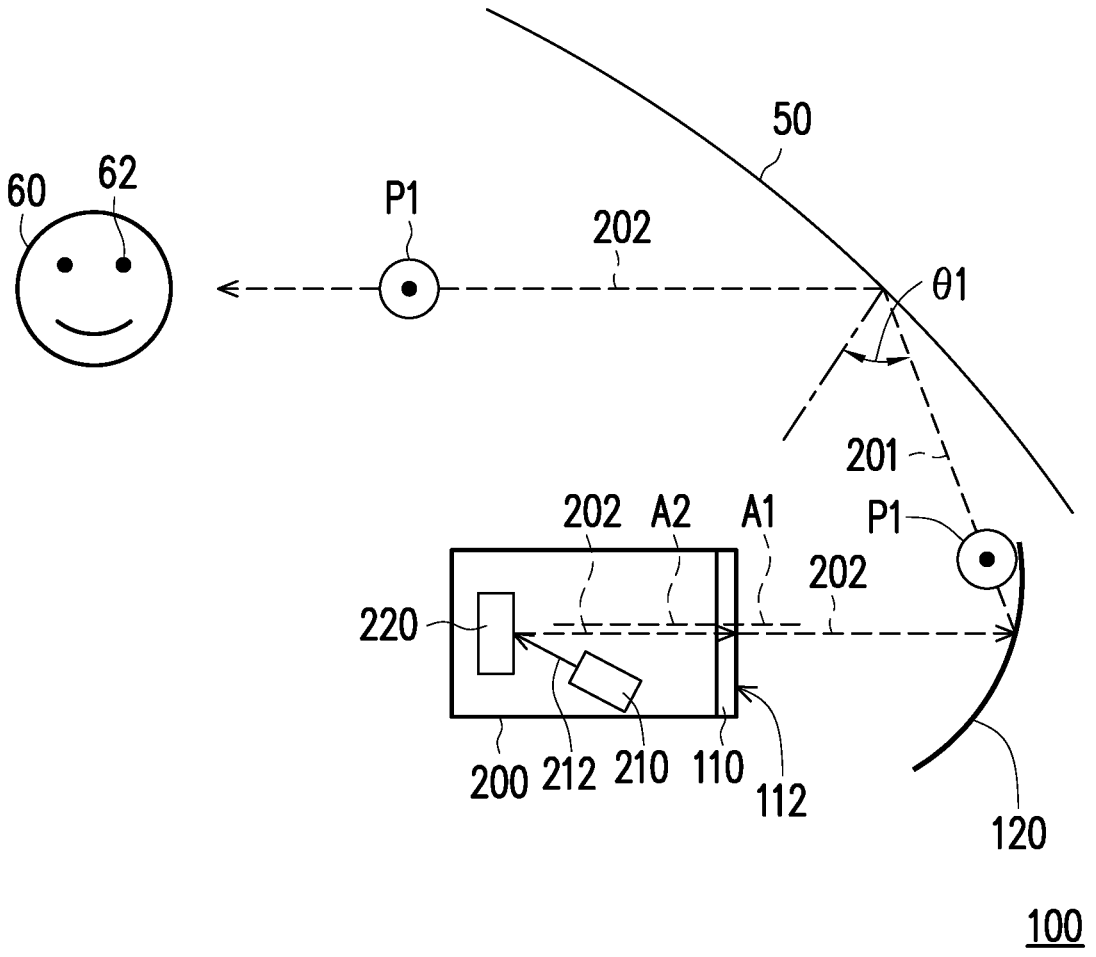
FIG. 1 is a schematic view of a head-up display system according to an embodiment of the invention.

FIG. 1 is a schematic view of a head-up display system according to an embodiment of the invention. Referring to FIG. 1, the head-up display system 100 in this embodiment includes a polarizing optical engine 200 and a first rotatable diffuser 110. The polarizing optical engine 200 is configured to provide a polarized image beam 202. In this embodiment, the polarizing optical engine 200 includes a laser source 210 and a light valve 220. The laser source 210 is configured to emit a laser beam 212. In this embodiment, the laser source 210 may include at least one laser diode. The light valve 220 is disposed on a path of the laser beam 212 and configured to convert the laser beam 212 into the polarized image beam 202. The light valve 202 is, for example, a liquid-crystal-on-silicon (LCOS) panel. In this embodiment, the LCOS panel may generate a holographic image.

The first rotatable diffuser 110 is disposed on a path of the polarized image beam 202 and configured to rotate when the polarized image beam 202 passes through the first rotatable diffuser 110. In this embodiment, a rotation axis A1 of the first rotatable diffuser 110 is along the propagation direction of the polarized image beam 202. The first rotatable diffuser 110 is made of isotropic material. The isotropic material has equal refractive indices in various directions; that is, the isotropic material is not a birefringent material. In this embodiment, the isotropic material is glass having equal refractive indices in various directions. In addition, in this embodiment, the polarized image beam 202 forms an image on the first rotatable diffuser 110.

The polarized image beam 202 from the first rotatable diffuser 110 obliquely strikes a windshield 50 and is then reflected by the windshield 50 to the eyes 62 of a user 60, so that the eyes 62 of the user can see a virtual image, and the windshield 60 is between the virtual image and the eyes 62 of the user 60. In this embodiment, a central ray 201 of the polarized image beam 202 traveling along an optical axis A2 of the polarizing optical engine 200 is incident on the windshield 50 at an incident angle θ1, wherein the incident angle θ1 is greater than or equal to a Brewster's angle of the windshield 50 minus 10 degrees and is less than or equal to the Brewster's angle plus 10 degrees. The Brewster's angle of the windshield 50 depends on the material of the windshield 50. In an embodiment, the material of the windshield 50 is glass used by various car manufacturers for a windshield, and has a refractive index being about 1.52 and a Brewster's angle being about 56 degrees. If the Brewster's angle is θb, then $\theta b - 10° \le \theta 1 \le \theta b + 10°$. When the incident angle θ1 is about the Brewster's angle θb, the windshield 50 is capable of reflecting most of an s-polarized light of the polarized image beam 202 to the eyes 62 of the user 60 and capable of being passed through by a p-polarized light of the polarized image beam 202. In this embodiment, the polarization direction P1 of the polarized image beam 202 is the s-polarized direction with respect to the windshield 50, so that the information of the polarized image beam 202 may be reflected by the windshield 50 to the eyes 62 of the user 60.

In the head-up display system 100 in this embodiment, the first rotatable diffuser 110 is made of isotropic material, so that when the first rotatable diffuser 110 rotates, the polarization direction P1 of the polarized image beam 202 does not rotate with the rotation of the first rotatable diffuser 110. As a result, when the windshield 50 reflects an s-polarized light of the polarized image beam 202 to the eyes 62 of the user, the intensity of the s-polarized light does not vary with the rotation of the first rotatable diffuser 110, so that the head-up display system 100 can provide a stable image, which means that the image does not flicker, and can reduce speckle phenomenon by the rotation of the first rotatable diffuser 110.

In this embodiment, the head-up display system 100 further includes a curved mirror 120 disposed on the path of the polarized image beam 202 from the first rotatable diffuser 110 and configured to reflect the polarized image beam 202 from the first rotatable diffuser 110 to the windshield 50. In this embodiment, the curved mirror 120 is a freeform mirror. In other embodiments, the curved mirror 120 may be a concave mirror or a convex mirror.

In this embodiment, the first rotatable diffuser 110 has a diffusive surface 112. In this embodiment, the diffusive surface 112 is a sand blasted surface. However, in other embodiments, the diffusive surface 112 may be a rough surface other than the sand blasted surface.

Figure 2:
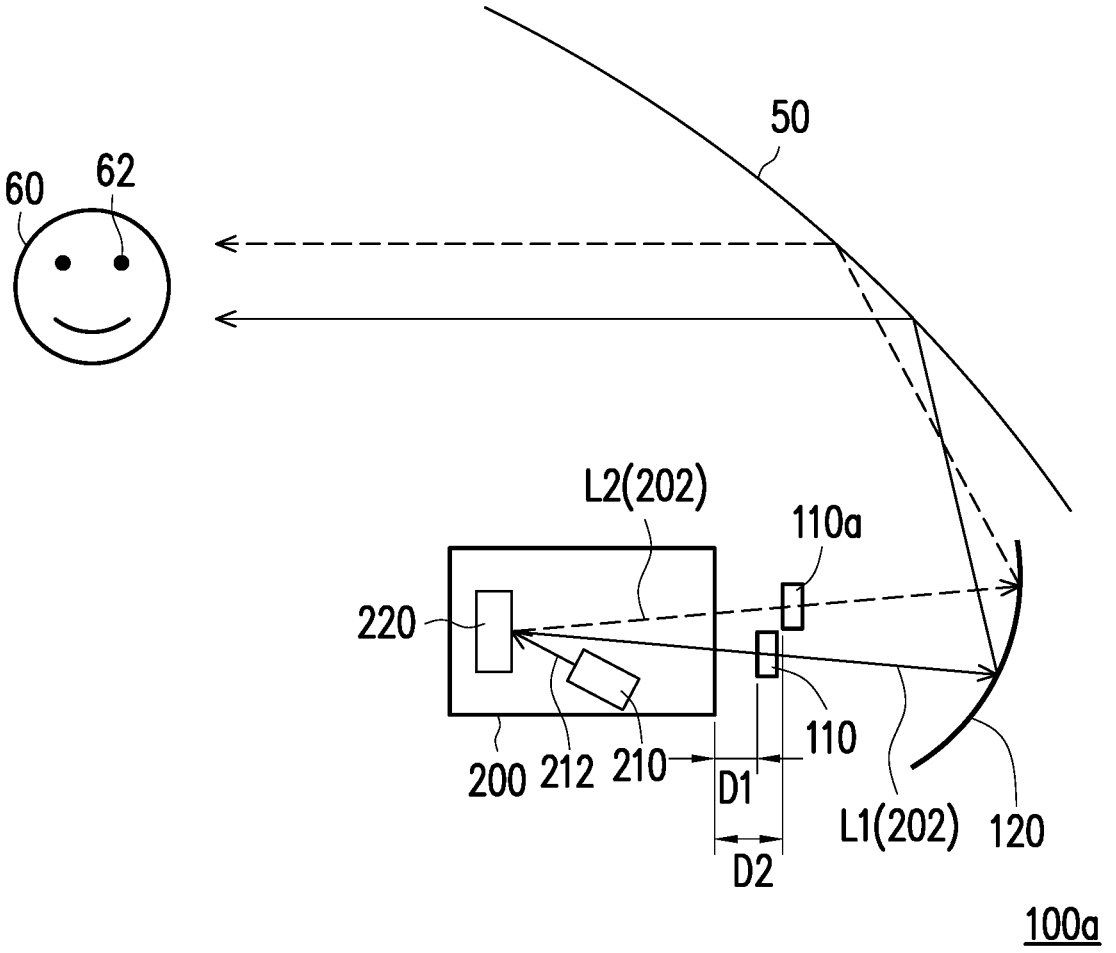
FIG. 2 is a schematic view of a head-up display system according to another embodiment of the invention.

FIG. 2 is a schematic view of a head-up display system according to another embodiment of the invention. Referring to FIG. 2, the head-up display system 100a in this embodiment is similar to the head-up display system 100 in FIG. 1, and the main difference therebetween is as follows. In this embodiment, the first rotatable diffuser 110 is disposed on a path of a first part L1 of the polarized image beam 202, and the head-up display system 100a further includes a second rotatable diffuser 110a disposed on a path of a second part L2 of the polarized image beam 202 and configured to rotate when the second part L2 of the polarized image beam 202 passes through the second rotatable diffuser 110a. The second rotatable diffuser 110a is also made of isotropic material, and a distance D1 between the first rotatable diffuser 110 and the polarizing optical engine 200 is different from a distance D2 between the second rotatable diffuser 110a and the polarizing optical engine 200. In this embodiment, the first part L1 of the polarized image beam 202 forms a first image on the first rotatable diffuser 110, and the second part L2 of the polarized image beam 202 forms a second image on the second rotatable diffuser 110a. Therefore, the first part L1 and the second part L2 respectively form two virtual images at different distances from the eyes 62 of the user 60.

In the head-up display system according to the embodiment of the invention, the first rotatable diffuser is made of isotropic material, so that when the first rotatable diffuser rotates, the polarization direction of the polarized image beam does not rotate with the rotation of the first rotatable diffuser. As a result, when the windshield reflects an s-polarized light of the polarized image beam to the eye of the user, the intensity of the s-polarized light does not vary with the rotation of the first rotatable diffuser, so that the head-up display system can provide a stable image and can reduce speckle phenomenon by the rotation of the first rotatable diffuser.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A head-up display system comprising:
a polarizing optical engine configured to provide a polarized image beam; and
a first rotatable diffuser disposed on a path of the polarized image beam and configured to rotate when the polarized image beam passes through the first rotatable diffuser, wherein the first rotatable diffuser is made of isotropic material, the polarized image beam from the first rotatable diffuser obliquely strikes a windshield and is then reflected by the windshield to an eye of a user, the first rotatable diffuser is disposed on a path of a first part of the polarized image beam, the head-up display system further comprises a second rotatable diffuser disposed on a path of a second part of the polarized image beam and configured to rotate when the second part of the polarized image beam passes through the second rotatable diffuser, the second rotatable diffuser is made of isotropic material, a distance between the first rotatable diffuser and the polarizing optical engine is different from a distance between the second rotatable diffuser and the polarizing optical engine, the path of the first part of the polarized image beam passes through the first rotatable diffuser without passing through the second rotatable diffuser, and the path of the second part of the polarized image beam passes through the second rotatable diffuser without passing through the first rotatable diffuser.

2. The head-up display system according to claim 1 further comprising a curved mirror disposed on the path of the polarized image beam from the first rotatable diffuser and configured to reflect the polarized image beam from the first rotatable diffuser to the windshield.

3. The head-up display system according to claim 2, wherein the curved mirror is a freeform mirror.

4. The head-up display system according to claim 1, wherein the isotropic material of the first rotatable diffuser is glass having equal refractive indices in various directions.

5. The head-up display system according to claim 4, wherein the first rotatable diffuser has a diffusive surface.

6. The head-up display system according to claim 5, wherein the diffusive surface is a sand blasted surface.

7. The head-up display system according to claim 1, wherein a central ray of the polarized image beam traveling along an optical axis of the polarizing optical engine is incident on the windshield at an incident angle, wherein the incident angle is greater than or equal to a Brewster's angle of the windshield minus 10 degrees and is less than or equal to the Brewster's angle plus 10 degrees.

8. The head-up display system according to claim 1, wherein the first part of the polarized image beam forms a first image on the first rotatable diffuser, and the second part of the polarized image beam forms a second image on the second rotatable diffuser.

9. The head-up display system according to claim 1, wherein the polarized image beam forms an image on the first rotatable diffuser.

* * * * *